United States Patent
Cameron et al.

(10) Patent No.: US 7,631,060 B2
(45) Date of Patent: Dec. 8, 2009

(54) IDENTITY SYSTEM FOR USE IN A COMPUTING ENVIRONMENT

(75) Inventors: Kim Cameron, Bellevue, WA (US); Don Hacherl, North Bend, WA (US)

(73) Assignee: Microsoft Corporation, Redmond, WA (US)

( * ) Notice: Subject to any disclaimer, the term of this patent is extended or adjusted under 35 U.S.C. 154(b) by 571 days.

(21) Appl. No.: 10/693,021

(22) Filed: Oct. 23, 2003

(65) Prior Publication Data

US 2005/0091264 A1    Apr. 28, 2005

(51) Int. Cl.
G06F 15/173    (2006.01)
(52) U.S. Cl. .................. 709/223; 711/216; 713/168; 705/1
(58) Field of Classification Search .............. 709/223; 711/216; 713/168; 705/1
See application file for complete search history.

(56) References Cited

U.S. PATENT DOCUMENTS

| | | | |
|---|---|---|---|
| 5,542,078 A | 7/1996 | Martel et al. | |
| 5,634,052 A | 5/1997 | Morris | |
| 5,778,395 A | 7/1998 | Whiting et al. | |
| 5,832,498 A | 11/1998 | Exertier | |
| 6,125,378 A | 9/2000 | Barbano | 708/254 |
| 6,237,035 B1 | 5/2001 | Himmel et al. | |
| 6,292,880 B1* | 9/2001 | Mattis et al. | 711/216 |
| 7,017,162 B2 | 3/2006 | Smith et al. | 719/328 |
| 2001/0054072 A1 | 12/2001 | Discolo et al. | 709/206 |
| 2002/0042716 A1* | 4/2002 | Carroll et al. | 705/1 |
| 2002/0114522 A1 | 8/2002 | Seeber | |
| 2002/0193162 A1* | 12/2002 | Walker et al. | 463/42 |
| 2003/0177356 A1* | 9/2003 | Abela | 713/168 |
| 2003/0220835 A1* | 11/2003 | Barnes, Jr. | 705/14 |
| 2003/0236859 A1 | 12/2003 | Vaschillo et al. | |
| 2004/0019874 A1 | 1/2004 | Edwards et al. | |
| 2004/0044837 A1 | 3/2004 | Hasbun et al. | |
| 2004/0078782 A1 | 4/2004 | Clement et al. | |
| 2004/0093587 A1 | 5/2004 | Sesma | |
| 2004/0128508 A1 | 7/2004 | Wheeler et al. | 713/170 |

(Continued)

OTHER PUBLICATIONS

Patent Cooperation Treaty (PCT), Notification of Transmittal of the International Search Report and The Written Opinion of the International Searching Authority, dated May 10, 2007.

(Continued)

*Primary Examiner*—Thanh Tammy Nguyen
(74) *Attorney, Agent, or Firm*—Merchant & Gould PC (57) ABSTRACT

A system for identifying principals within a computing environment is disclosed. The system includes principal objects containing identity claims. The principal objects are used by computer processes within the environment to perform tasks related to the association of principals to activated resource objects. Exemplary principals include individuals, a group of individuals, organizations and computer modules and devices. Each identity claim uniquely identifies a specific principal within a particular scheme. To accomplish this, each identity claim includes an assertion that specifies an identification string unique to a principal within the associated scheme. Exemplary schemes for an individual include email accounts, telephone numbers, credit card account numbers and social security numbers. Thus, exemplary identification strings for an individual are specific email addresses, specific telephone numbers, etc. Exemplary schemes for a group of individuals and organizations include telephone numbers and web page addresses. The system also determines whether two principal objects conflict, thereby resulting in an identity fault.

25 Claims, 6 Drawing Sheets

U.S. PATENT DOCUMENTS

| | | | |
|---|---|---|---|
| 2004/0128514 A1* | 7/2004 | Rhoads | 713/176 |
| 2004/0243682 A1* | 12/2004 | Markki et al. | 709/207 |
| 2004/0267869 A1 | 12/2004 | Bodin et al. | 709/200 |

OTHER PUBLICATIONS

Fernique, P., et al., *CDS GLU, A Tool for Managing Heterogeneous Distributed Web Services*, Astronomical Society of the Pacific Conference Series, vol. 145, p. 466-9. (1998).

Tian, Qing, et al., *Location Management in a Heterogeneous Network Environment*, IEEE Wireless Communications and Networking. vol. 2, p. 753-8. (2000).

Paskin, N., *Toward Unique Identifiers*, Proceedings of the IEEE. vol. 87, No. 7, p. 1208-27. (1999).

Neame, R., *Communications and HER: Authenticating Who's Who is Vital*, International Journal of Medical Informatiics. vol. 60, No. 2, p. 185-90. (2000).

Cingil, I., *Supporting Global User Profiles Through Trusted Authorities*, SIGMOD Record. vol. 31, No. 1, 1.11-17. (2002).

Adya, A., et al., *Analyzing the Browse Patterns of Mobile Clients*, Proceedings of the First ACM SIGCOMM Internet Measurement Workshop. p. 189-94. (2001).

Kondo, T., et al., *A Resource Reverence Technique Independent from Scheme and Location*. Proceedings of the IASTED International Conference on Internet and Multimedia Systems and Applications. p. 377-82. (2001).

Hung, Chi Chi, et al., *Adaptive Proxy-based Content Transformation Framework for the World-Wide Web*, Proceedings on the Fourth International Conference/Exhibition on High Performance Computing in the Asia-Pacific Region. vol. 2, p. 747-50. (2000).

Carlier, D., et al., *Task Delegation Model Assigned to Mobile Computing*, Proceedings of ICICS. vol. 1, p. 220-4. (1997).

*Principles of Access Control*, Modern Office Technology. vol. 34, No. 11, p. 44-5, 48. (Nov. 1989).

Samaras, G., et al., *Managing Transaction Identifiers in the Peer-to-Peer Distributed Transactional Environment*, IBM Corporation. p. 796-803.

Booth, L., *Implementing Distributed Applications Using Object Technology*, Object EXPO Europe Conference Proceedings. p. 141-4. (1993).

Pasaya, B., et al., *A Temporal Object Oriented Conceptual Schema Model*, IEEE Pacific RIM Conference on Communications, Computers and Signal Processing. vol. II, p. 724-727. (2001).

Sollins and Masinter, *Functional Requirements for Uniform Resource Names*, Network Working Group, Request for Comments: 1737, Dec. 1994.

Dec. 2000, Computer—A National-Scale Authentication Infrastructure, by Randy Butler, Von Welch, Douglas Engert, Ian Foster, Steven Tuecke, John Volmer and Carl Kesselman, pp. 60-66.

Apr. 2002, DCW 2002 (2002:Sydney, N.S.W.): Distributed communities on the web: $4^{th}$ International Workshop—PINAS: Supporting a Community of Co-Authors on the Web, by John Plaice, Peter G. Kropf, Peter Schulthess and Jacob Slonim (Eds.), pp. 113-124.

Dafni, G.J., *Generating Unique Identifiers In A Distributed System*, University of Texas at Austin, 14 pp., (1985).

International Search Report, cited in Int'l Appl. No. PCT/US04/24342, dated May 10, 2007.

Written Opinion of the ISA, cited in Int'l Appl. No. PCT/US04/24342, dated May 10, 2007.

Furmento et al., "ICEN: an Open Grid Service Architecture Implemented with Jini", IEEE, 2002, pp. 1-10.

\* cited by examiner

400 → IdentityClaim {
402 → urnScheme: varchar
404 → urnValue: varchar
406 → humanDisplayString: nvarchar
408 → associatedURL: URL
410 → startDate: datetime
412 → endDate: datetime
414 → signature: varbinary
}

500 → IdentityReference {
502 → urnScheme: varchar
504 → urnValue: varchar
506 → referenceDate: datetime
}

IDENTITY SYSTEM FOR USE IN A COMPUTING ENVIRONMENT

TECHNICAL FIELD

The present invention relates to identifying entities within a bounded system, and more particularly to identification of principals within a computing environment.

BACKGROUND OF THE INVENTION

Distributed computer networks, such as the Internet and organizational intranets, provide users the ability to exchange information with other users at a much faster pace than previous methods, such as for example, saving a file to a data storage disc and physically delivering the disc to another's computing system. Within these distributed environments, a communication medium is established between at least two computers that enables information to be transferred by way of electronic mail, file sharing or other conventional information transfer mechanisms. While distributed computing certainly has its benefits over prior methods for information exchange, many of the same drawbacks realized with these previous practices have carried over into the distributed computing world.

One such problem is authentication as it relates to the ability of recipient users to view and manipulate information sent from other users. That is, there exists a security concern that a user that receives or accesses information is indeed a user that is authenticated to receive or access that information. Another similar problem relates to whether the user sending the information is really the entity that the user claims to be. Both of these concerns are based on a single underlying concept—identification. Indeed, current systems, regardless of whether the systems embody a single, stand-alone computer or multiple computers interconnected within a distributed environment, do not provide an identification framework that may be used throughout the system by all resources implemented thereon.

It is with respect to these and other considerations that the present invention has been developed.

SUMMARY OF THE INVENTION

In accordance with the present invention, the above and other problems are solved by an identity system for identifying principals within a computing environment. The identity system is implemented using multiple principal objects each corresponding to a specific authenticated to perform a digital action within the computing environment. Each of these principal objects are operable for use by a computer process within the computing environment to associate at least one resource object with the specific principal corresponding to the principal object. At least one of the principal objects is associated with at least two identity claims. Both identity claims associated with this principal object separately and uniquely identify the object with the specific principal.

In accordance with an embodiment, the present invention is embodied in a data structure for use by the computer process in identifying a principal authenticated to perform a digital action within the computing environment. The data structure includes various assertions, including a value assertion that uniquely identifies the principal within a particular identification scheme and a type assertion that indicates the particular identification scheme corresponding to the value assertion. Further, the data structure includes a time reference assertion that specifies a time frame in which the principal is uniquely identified by the value assertion within the particular identification scheme. In an embodiment, this data structure represents the identity claim of the identity system summarized in the preceding paragraph.

In accordance with embodiments of the present invention, the data structure is encoded on an article of manufacture such as a computer program product or computer readable media. The computer program product may be a computer storage media readable by a computer system and encoding a computer program of instructions for executing a computer process. The computer program product may also be a propagated signal on a carrier readable by a computing system and encoding a computer program of instructions for executing a computer process.

In accordance with yet another embodiment, the present invention is directed to a method for identifying a principal authenticated to perform a digital action within a computing environment. First, a principal object is created for use by a computer process within the computing environment to identify the principal as being associated with a plurality of resource objects. These resource objects are maintained within the computing environment. Next, the principal object is associated with an identity claim that uniquely identifies the principal within a particular identification scheme. Such unique identification is accomplished by assignment of unique identification strings to a group of principals, wherein the principal is part of this group.

The method then includes receiving a plurality of resource objects. These resource objects represent resources that are associated with multiple application programs. Further, each of these multiple resource objects are associated with an identity reference that includes a declaration linking each resource object to the principal object. The method then identifies each of these received resource objects as being associated with the principal based on the declaration links contained in the associated identity references. The computer process then performs tasks that utilize the fact that the principal is identified as being associated with each of these resource objects.

The method in accordance with the embodiment described in the preceding paragraphs is implemented in accordance with an embodiment as a computer process derived form instructions encoded on or in an article of manufacture such as a computer program product or computer readable media. The computer program product may be a computer storage media readable by a computer system and encoding a computer program of instructions for executing a computer process. The computer program product may also be a propagated signal on a carrier readable by a computing system and encoding a computer program of instructions for executing a computer process.

BRIEF DESCRIPTION OF THE DRAWINGS

Having thus described the invention in general terms, reference will now be made to the accompanying drawings, which are not necessarily drawn to scale, and wherein:

DETAILED DESCRIPTION OF THE INVENTION

The present invention will now be described more fully hereinafter with reference to the accompanying drawings, in which embodiments of the invention are shown. This invention may, however, be embodied in many different forms and should not be construed as limited to the embodiments set forth herein; rather, these embodiments are provided so that this disclosure will be thorough and complete, and will fully convey the scope of the invention to those skilled in the art. Like numbers refer to like elements throughout.

In general, the present invention relates to identifying principals within a computing environment. In accordance with alternative embodiments of the invention, this computing environment may be either a single, stand-alone computer system or multiple computer systems interconnected to form a distributed computer network, such as the Internet or an Intranet.

As defined herein, a principal is any individual, group of individuals or computer module that performs some action in a computing environment. Exemplary principals include operating systems, computer application programs and processes implemented on an operating system, individuals, and groups of people (e.g., households, corporations, organizations, etc.).

A resource is defined herein as a machine-readable form of data arranged in a manner to constitute an electronic file. Exemplary resources include, without limitation, web pages, electronic documents (electronic mail, word processing documents, spreadsheets, drawings, graphics, etc.), sound files, movie files, or any other portion of data readable by a computer system. In order to clearly illustrate embodiments of the present invention, the exemplary resources shown and described herein are word processing documents. As such, combining the definitions for the terms "principal" and "resource," an example action which may be performed by a principal within a computing environment would be the creation, access, revision or deletion of a word processing document. Those skilled in the art will recognize that the present invention is applicable to all other forms of resources as well.

Figure 1:
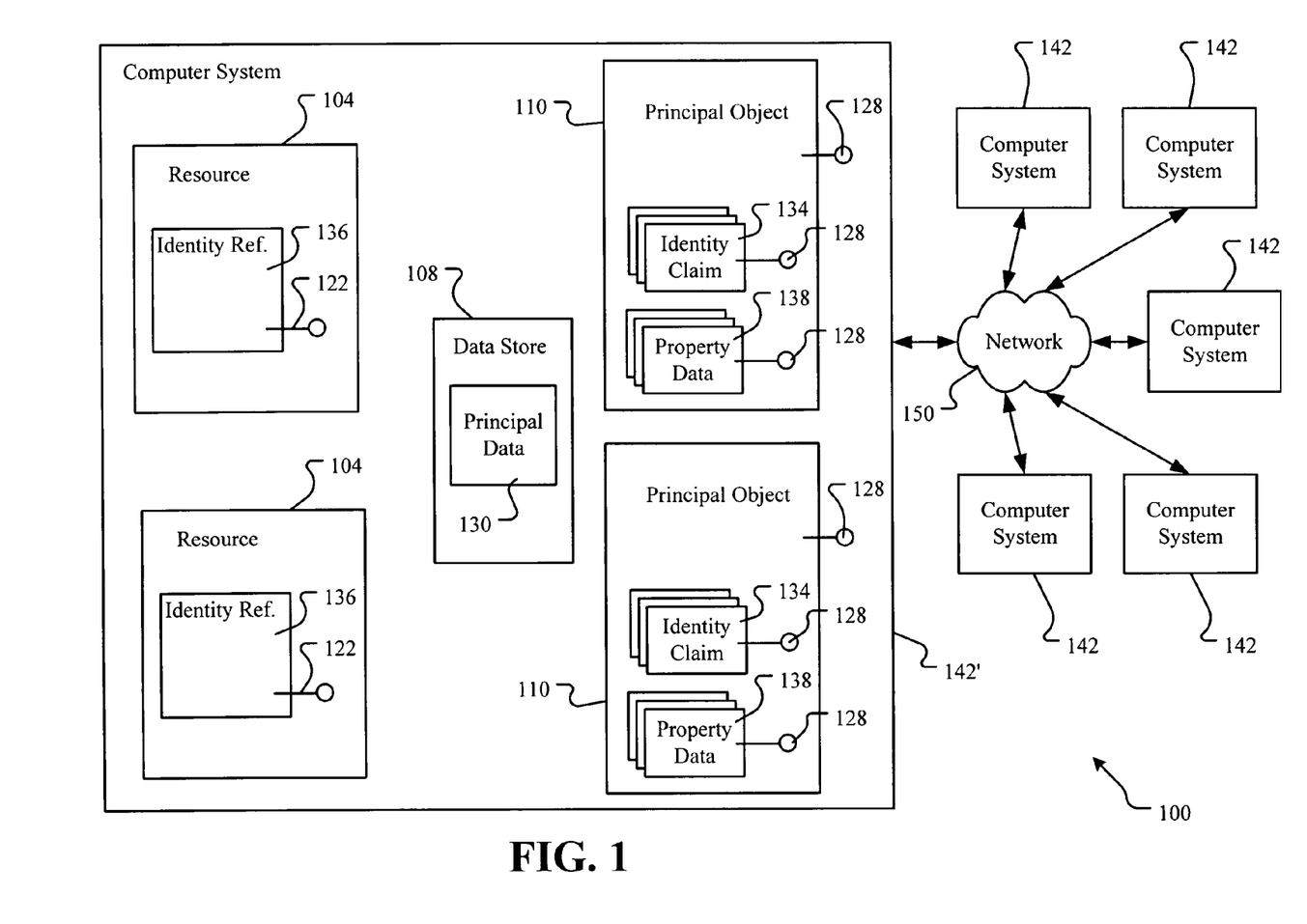
FIG. 1 illustrates an exemplary environment in which an identity system according to the present invention is practiced in accordance with an embodiment.

With these definitions and exemplary embodiments in mind, FIG. 1 depicts a logical illustration of a computing environment 100 in which embodiments of the present invention are practiced. The computing environment 100 includes a plurality of computer systems 142 interconnected by a communication network 150 to form a "distributed" computing environment. The computer systems 142 may be either client machines or server machines. For example, it is contemplated within an embodiment of the present invention that at least one of the computer systems 142 is a server machine operable for administering information exchange between a plurality of client machines. The client machines also access files on the server machine and other client machines by way of the communication network 150.

It should be appreciated that the communication network 150 may be any type of network known to those skilled in the art or an equivalence thereto. Some exemplary networks include, without limitation, the Internet, an Intranet, a private line network, or even a direct communication link between the computer systems 142. It should also be understood that the communication network 150 may utilize any number of communication technologies depending on functions required by the embodiment. Examples of specific technologies contemplated for use in the communications network 150 include without limitation terrestrial, cellular, satellite, short-wave, and microwave connections to the Internet, direct connections between facilities using modems or other interface devices, and connections through other communications networks such as local area networks or wide area networks. Any combination of these or other communications networks may be utilized while remaining within the scope of the invention.

In accordance with the present invention, a system for identifying principals in the computing environment 100 is implemented on at least one computing system 142 in the environment 100. For nomenclature purposes, this system, which is embodied in a collection of various structures shown in FIG. 1, is hereinafter referred to as an "identity system." For illustrative purposes, the identity system is shown in FIG. 1 and described below as being implemented on a single computer system 142'. However, the identity system described herein is actually implemented on other computer systems 142 in the environment 100. In accordance with an embodiment of the present invention, this identity system is implemented on all systems 142. Alternatively, this identity system may be implemented on fewer than all of the systems 142 in the environment 100.

This identity system includes electronic representations of principals referred to herein as "principal objects" 110. Other names which may be used to represent these electronic representations other than "principal object" are "identity information object" and "identity information document." The principal objects 110 are associated with identity claims 134 uniquely identifying the principal to which each object 110 corresponds and property data objects 138 that further describes that principal. The distinction between an identity claim 134 and a property data object 138 is that a property data object 138 includes information that does not uniquely identify the associated principal, but rather simply describes characteristics and other properties associated with the principal.

An identity claim 134 is embodied in a data structure that contains information (referred to herein as "assertions") uniquely identifying a principal object 110 that the claim 134 is associated with. Exemplary assertions that may be used to form an identity claim 134 include, but are not limited to, email addresses, telephone numbers (both landline and mobile), credit card account numbers, social security numbers, driver's license numbers, etc. Because a principal may be uniquely identified using more than one assertion (i.e., most people have at least an email address and a phone number), each principal object 110 in the identity system is operable to be associated with more than one identity claim 134. To briefly contrast property data objects 138 from identity claims 134, an exemplary property data object 138 for a principal that is an individual includes data related to the individual's age, sex, height and weight. This type of information cannot be an assertion for an identity claim 134 because this information is not unique to any individual.

Besides principal objects 110, identity claims 134 and property data objects 138, the identity system also includes identity references 136. Identity references 136 are references to identity claims 134 that link resources 104 in the computing environment 100 to associated principals. For example, an exemplary principal that would be associated with a word processing document is an author. Other exemplary identity references 136 for a word processing document may be references 136 that link to identity claims 134 associated with principals authorized to view and/or revise the document. The relationship and distinctions between identity claims 134 and identity references 136 are described in greater detail below in connection with FIGS. 3-5.

In an embodiment, the principal objects 110, identity claims 134, the identity references 136 and the property data objects 138 are objects conforming to the Component Object Model (COM). As such, processes and other objects of any of the computer systems 142 in the computing environment 100 communicatively interact with these objects 110 by way of application program interfaces (APIs) 128 associated with each object 110. As known to those skilled in the art, APIs 128 expose the properties and methods (data and function members) of objects (e.g., 110, 134, 136 and 138) to processes and other objects within a computing environment (e.g., 100).

Because the identity references 136, the identity claims 134 and the property data objects 138 are enclosed by other objects, these enclosed objects each include an API 128 that is exposed only to the enclosing object (i.e., the principal object 110 for the identity claims 134 and property data objects 138 and the resource object 104 for the identity references 136) and not to other objects within the computing environment 100. As such, for an object or process within the computing environment 100 to request access to an identity claim 134 or a property data object 138, that object or process issues such a request to the associated principal object 110 via the API 128 for that object 110, which in turn, accesses the requested data via an API 128 for the identity claim 134 or property data object 138, whichever was requested.

In order for a process or module on a computer system 142 to utilize the principal objects 110, and therefore the data contained on objects (e.g., identity claims 134 and property data 138) thereon, these objects, like any other objects conforming to COM, must first be instantiated. A principal object 110 is said to be "instantiated" when data forming the object 110 is loaded into memory and the data of the identity claims 134 and property data 138 as well as any function members (i.e., methods) of the object 110 are available to other objects. This terminology is useful in distinguishing between a principal object 110 and the raw data that must be read into memory to instantiate the object 110. However, for illustrative purposes and to provide clarity throughout this specification, the descriptions of various embodiments of the invention provided in connection with FIGS. 3-7 do not distinguish between processes performed on the raw form of an object (e.g., principal object 110, identity claim 134, identity reference 136 and property data object 138) and the instantiated form of an object. Rather, both of these forms are simply embodied in the term "object." Nevertheless, FIG. 1 does illustrate this distinction by including within the data store 108 "principal data," which is the raw data used to form the principal objects 110 as well as the data embodying the identity claims 134 and the property data 138 on the computer system 142'.

Figure 2:
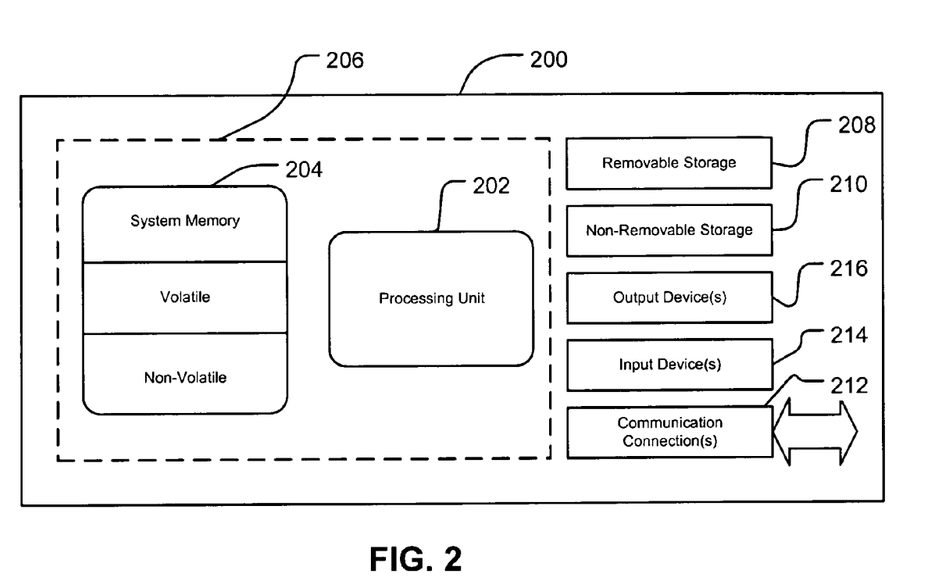
FIG. 2 shows a computer system that may be used according to particular aspects of the present invention.

FIG. 2 illustrates an example of a suitable computing system 200 on which embodiments of the invention may be implemented. As such, this system 200 is representative of one that may be used to function as a computer system 142 in the distributed computing environment 100. In its most basic configuration, system 200 includes at least one processing unit 202 and memory 204. Depending on the exact configuration and type of computing device, memory 204 may be volatile (such as RAM), non-volatile (such as ROM, flash memory, etc.) or some combination of the two. This most basic configuration is illustrated in FIG. 2 by dashed line 206.

In addition to the memory 204, the system 200 may include at least one other form of computer-readable media. Computer readable media, also referred to as a "computer program product," can be any available media that can be accessed by the system 200. By way of example, and not limitation, computer-readable media might comprise computer storage media and communication media.

Computer storage media includes volatile and nonvolatile, removable and non-removable media implemented in any method or technology for storage of information such as computer readable instructions, data structures, program modules or other data. Memory 204, removable storage 208 and non-removable storage 210 are all examples of computer storage media. Computer storage media includes, but is not limited to, RAM, ROM, EEPROM, flash memory or other memory technology, CD-ROM, digital versatile disks (DVD) or other optical storage, magnetic cassettes, magnetic tape, magnetic disk storage or other magnetic storage devices, or any other medium which can be used to store the desired information and which can accessed by system 200. Any such computer storage media may be part of system 200.

The exemplary computing system 200 may also contain a communications connection(s) 212 that allow the system to communicate with other devices. The communications connection(s) 212 is an example of communication media. Communication media typically embodies computer readable instructions, data structures, program modules or other data in a modulated data signal such as a carrier wave or other transport mechanism and includes any information delivery media. The term "modulated data signal" means a signal that has one or more of its characteristics set or changed in such a manner as to encode information in the signal. By way of example, and not limitation, communication media includes wired media such as a wired network or direct-wired connection, and wireless media such as acoustic, RF, infrared and other wireless media. The term computer readable media as used herein includes both storage media and communication media.

In accordance with an embodiment, the system 200 includes peripheral devices, such as input device(s) 214 and/or output device(s) 216. Exemplary input devices 214 include, without limitation, keyboards, computer mice, pens, or styluses, voice input devices, tactile input devices and the like. Exemplary output device(s) 216 include, without limitation, displays, speakers, and printers. Each of these "peripheral devices" are well know in the art and, therefore, not described in detail herein.

With the computing environment in mind, embodiments of the present invention are described with reference to logical operations being performed to implement processes embodying various embodiments of the present invention. These logical operations are implemented (1) as a sequence of computer implemented steps or program modules running on a computing system and/or (2) as interconnected machine logic circuits or circuit modules within the computing system. The implementation is a matter of choice dependent on the performance requirements of the computing system implementing the invention. Accordingly, the logical operations making up the embodiments of the present invention described herein are referred to variously as operations, structural devices, acts or modules. It will be recognized by one skilled in the art that these operations, structural devices, acts and modules may be implemented in software, in firmware, in special purpose digital logic, and any combination thereof without deviating from the spirit and scope of the present invention as recited within the claims attached hereto.

Figure 3:
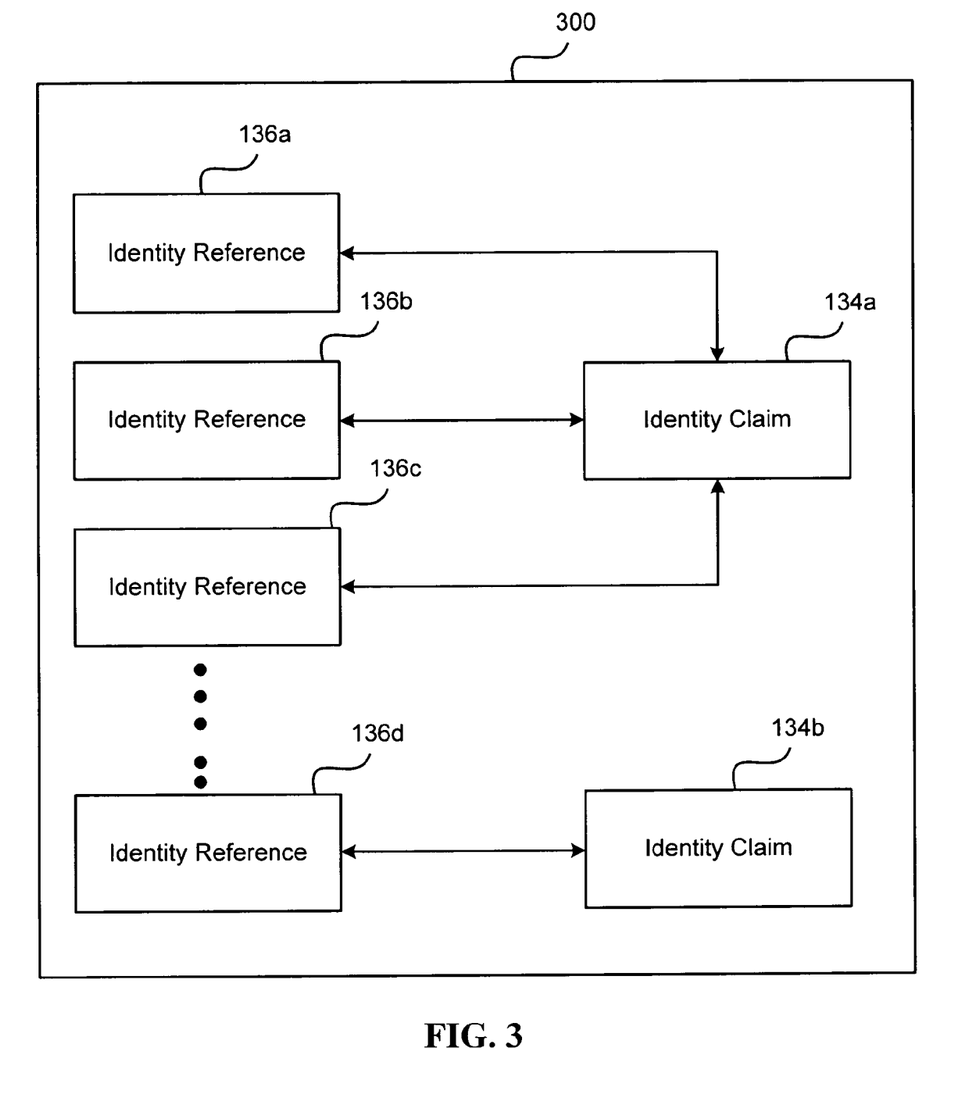
FIG. 3 is a block diagram logically illustrating relational aspects between identity claims and identity references of the identity system shown in FIG. 1.

Referring now to FIG. 3, the relationship between identity references 136 and identity claims 134 within an identity system 300 is logically illustrated in accordance with an embodiment of the present invention. More specifically, FIG. 3 shows linking of multiple identity references 136a, 136b and 136c to a single identity claim 134a as well as the linking of a single identity reference 136d to a single identity claim 134b. It should be appreciated that FIG. 3 is a high-level illustration of the relationship between identity references 136 and identity claims 134, and that any number of identity references 136 may be linked to any number of either of the identity claims 134a and 134b.

In an embodiment, the identity references 136 and the identity claims 134 making up the identity system 300 are implemented on multiple computers within the distributed computing environment. To illustrate, the identity reference (e.g., 136b) may be associated with a resource stored on a first computer system 142 whereas the identity claim 134a to which this reference 136b is linked is contained in a principal object 110 maintained on a second computer system 142. Alternatively, the identity references 136 and the identity claims 134 making up the identity system 300 are stored on a single, stand-alone computer system 142. Establishment of the link between identity references 136 and identity claims 134 is described in detail in connection with FIGS. 4 and 5, and therefore not repeated while describing FIG. 3. Instead, only the logical relationship between these objects is described.

Each of the identity references 136a, 136b and 136c linked to the single identity claim 134a are associated with a different resources. For example, identity reference 136a may be associated with a word processing document, identity reference 136b may be associated with a spreadsheet document and identity reference 136c may be associated with an electronic mail document. Each of these identity references (136a, 136b and 136c) link to the same identity claim 134a, and therefore identify each of these resources as being associated with the principal corresponding to the identity claim 134a. This principal may be, for example, an individual that authored each of these documents. Another exemplary principal may be an organization employing the authoring individual. Likewise, the identity reference 136d links the resource to which this reference 136d is associated to the identity claim 134b. As such, this resource is identified by the identity system 300 as being associated with the principal corresponding to the claim 134b.

Figure 4:
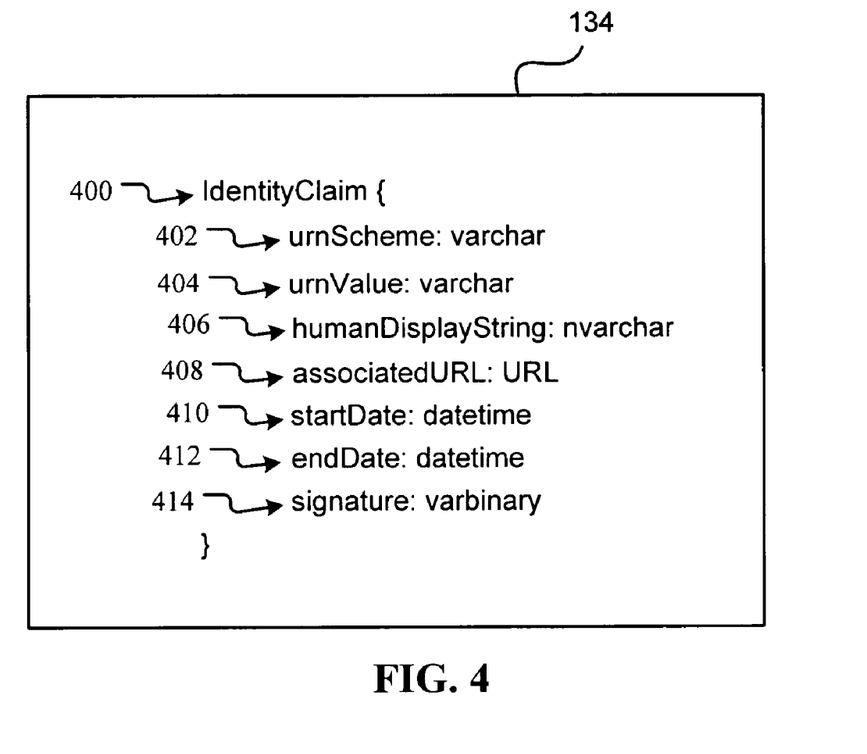
FIG. 4 is an exemplary portion of a code listing for a data structure embodying an identity claim in accordance with an embodiment of the present invention.
Figure 5:
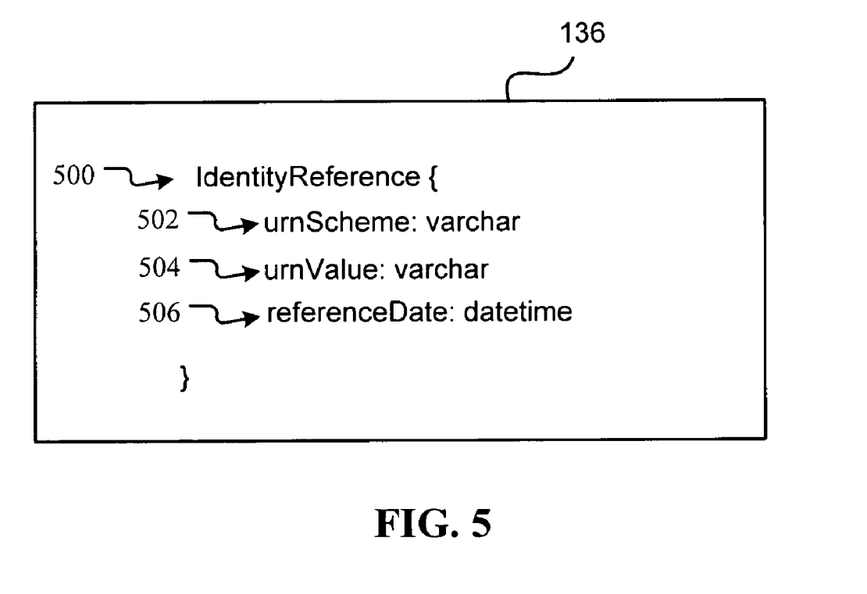
FIG. 5 is an exemplary portion of a code listing for a data structure embodying an identity reference in accordance with an embodiment of the present invention.

Referring now to FIGS. 4 and 5, exemplary data structures for an identity claim 134 and an identity reference 136, respectively, are shown in accordance with an embodiment of the present invention. In accordance with an embodiment, each of these data structures are Extensible Markup Language (XML) based software modules, however, other programming languages may be use to create these data structures and these other languages are contemplated within the scope of the present invention. With specific reference to FIG. 4, the identity claim 134 includes various assertions 402-414 that collectively uniquely identify a single principal. As described above, this principal may be a computer entity or device, a group of computer entities or devices, an individual or an group of individuals. To illustrate embodiments of the present invention, however, the identity claim 134 is described below as identifying a single individual.

The data structure for the identity claim 134 includes a type declaration 400 identifying the structure as being an identity claim 134. As such, this type declaration 400 is phrased "IdentityClaim." The data structure further includes a type assertion 402 and a value assertion 404. Optional assertions include a display assertion 406, a web site assertion 408, a beginning time frame assertion 410, an ending time frame assertion 412 and a signature assertion 414.

The type assertion 402 indicates the type of unique identifier that will be associated with the identity claim 134. Exemplary type assertions 402 include, without limitation, the following: "tel" or "fax," which indicate that the unique identifier is a telephone number; "mailto," which indicates that the unique identifier is an email address; "http," which indicates that the unique identifier is a web address; "sid," which indicates that the unique identifier is a security identifier; "ssn," which indicates that the unique identifier is a social security number; and "cc#," which indicates that the unique identifier is a credit card account number. Many other types of unique assertions are contemplated within the scope of the present invention, but not listed in the preceding sentence. Indeed, so long as an assertion is of the type that it specifies values specific to one and only one principal, the assertion is operable to function as a type assertion 402.

The value assertion 404 is based on the type assertion 402 and denotes a sequence of characters (alphanumeric and/or symbols) that uniquely identify the principal. Exemplary value assertions 404 include, without limitation, the following: a telephone number (e.g., 0018004568494), an email address (e.g., tempuser@sampleserver.com), a web address (e.g., www.tempcomany.com), a social security number (e.g., 427894478), and a credit card account number (e.g., 4417354398478474). Identity of a principal is tied to the value assertion 406. It should be appreciated that a value assertion 406 may either identify an individual or device, or alternatively, a group of individuals or devices. For instance, a telephone number may identify either an individual, a household or a company. If the telephone number belongs to a household or a company, the identified principal identifies a group, whereas if the telephone number belongs to an individual, the identified principal is an individual.

Because certain type assertions 402 are of a type that associated value assertions 404 may uniquely identify different principals during different time frames, the data structure for the identity claim 134 optionally includes the beginning time frame assertion 410 and the ending time frame assertion 412. For example, these assertions 410 and 412 are used when the type assertion is of the type "tel," "fax," or "mailto" because these types indicate unique identifier types that vary over time.

The beginning time frame assertion 410 specifies the date on which the value assertion 404 became associated with the principal it uniquely identifies. The ending time frame assertion 412 specifies the date on which this association was terminated. To illustrate, in one time frame, John Doe may be uniquely identified by the telephone number 0018004763849, whereas in another time frame, Jane Doe may instead be uniquely identified by this telephone number. The beginning time frame assertion 410 and the ending time frame assertion 412 specify the start and end dates for these respective time frames thereby completing the unique identification of these identity claims 134 to John and Jane Doe. It should be appreciated that if an ending time frame assertion 412 is not provided, but a beginning time frame assertion 412 is provided, then the association between the value assertion 404 and the principal is still on-going.

Another optional assertion is the display assertion 406. The display assertion 406 is a string of alphanumeric characters based on the value assertion 404 and in a form that is recognizable to humans. For instance, the display assertion 406 may be the name of an individual displayed in conjunction with the individual's email address if the value assertion 404 is the email address. Yet another optional assertion is a web site assertion 408, which indicates a web address where further information related to a principal may be found. Another optional assertion is a signature assertion 414, which indicates a digital representation of a principal's signature.

Each of the aforementioned assertions, including the optional assertions, are used to uniquely link the identity claim 134 to a particular principal. Such is the intent of identity claims 134. Identity references 136, on the other hand, are for use in associating a resource (e.g., electronic document) to a principal. As noted above, this is accomplished by referencing a particular identity claim 134 within the identity reference 136. Referring now to FIG. 5, a data structure illustrating declarations made within an identity reference 136 is shown in accordance with an embodiment of the present invention. The data structure for the identity reference 136 includes a type declaration 500 identifying the structure as being an identity reference 136. As such, this type declaration 500 is phrased "IdentityReference."

In order to specify a particular identity claim 134, the identity reference 136 includes the type assertion 502 and the value assertion 504 corresponding to the identity claim 134 being referenced. As such, the developer of the resource establishes references to appropriate identity claims 134 during development of the resource. A reference date declaration 506 is also included within the structure for the identity reference 136 and indicates the date on which the resource associated with the identity reference 136 is validly linked to the identity claim 134 in question.

As the operating system of a computer system 142 activates a resource to which an identity reference 136 is associated, the operating system is directed to instantiate the identity reference 136 in order to instantiate and call methods of the appropriate principal object 110. The appropriate principal object 110 is determined based on the which identity claim 134 is referenced by the identity reference 136. After the appropriate principal object 110, and thus, the corresponding identity claim 134, is instantiated, methods on the resource object 104 call methods on the principal object 110 that associate the resource to the principal corresponding to the principal object 110. The operating system then performs tasks on the resource that utilize the identification of the resource to the principal object 110. Exemplary tasks include, without limitation, authorization to view and/or revise the resource, the display of principal characteristics and properties in association with the resource and providing a communication medium to the principal through the resource.

Figure 6:
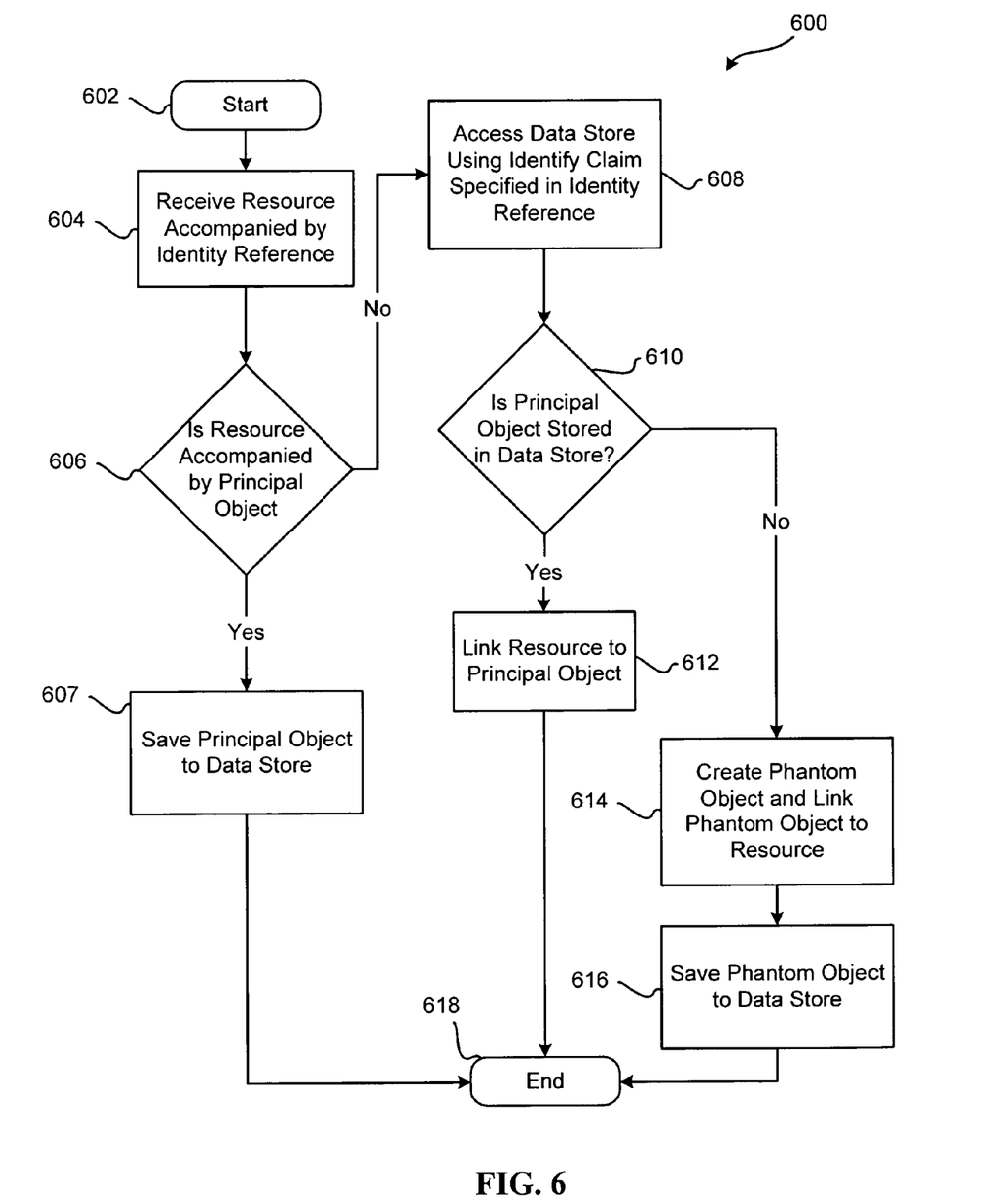
FIG. 6 is a flow diagram illustrating operational characteristics for a process for identifying an association between a resource in the computing environment of FIG. 1 and a principal within the identity system in accordance with an embodiment of the present invention.

Referring now to FIG. 6, a process 600 for establishing (hereinafter, "establishment process") an association between a resource and a principal object 110 is shown in accordance with an embodiment of the present invention. The establishment process 600 is performed using a flow of operations ("operation flow") beginning with a start operation 602 and concluding with a terminate operation 618. The start operation 602 is initiated as a resource is being accessed in some manner on a computer system 142. From the start operation 602, the operation flow passes to a receive operation 604 which receives the accessed resource into the establishment process 600 and locates an identity reference 136 associated with the resource. It should be appreciated that the term "receive" is being used in a general sense to refer to the access of the resource by the operating system of the computer system 142. As such, reception of a resource encompasses not only reception of the resource from another computer system 142, but also reception of the resource from storage local to the computer system 142 accessing the resource. Indeed, in the case of the latter, a user of the computer system 142 has requested that the resource be activated. From the receive operation 604, the operation flow passes to a first query operation 606.

The first query operation 606 detects whether the activated resource is accompanied by a principal object 110 containing an identity claim 134 that maps to the located identity reference 136. If so, this principal object 110 is said to be "piggy-backed" to the resource and the operation flow passes to a save operation 607. In this case, the link between the identity reference 136 and the associated identity claim 134 associates the resource as being identified with the principal corresponding to the principal object 110 having the associated identity claim 134. This identification association is used by the operating system in order to perform certain identification-related tasks. Further, the save operation 607 saves the principal object 110 to the data store 108 for future use in implementing the link between this and other identity references 136 linking to the identity claim 134. From the save operation 607, the operation flow concludes with the terminate operation 618.

If, on the other hand, the first query operation 606 does not detect a principal object 110 piggy-backed to the received resource, the operation flow is passed to an access data store operation 608. The access data store operation 608 uses the type assertion 402 and the value assertion 404 specified in the located identity reference 136 to look up whether a principal object 110 containing an associated identity claim 134 is already stored in the data store 108. From the access data store operation 608, the operation flow passes to a second query operation 610.

The second query operation 610 queries whether the access data store operation 608 found a principal object 110 containing an identity claim 134 having the type assertion 502 and value assertion 504 specified in the located identity reference 136. If so, the operation flow passes to a link operation 612. The link operation 612 links the identity reference 136 to the associated identity claim 134 thereby associating the resource with the principal corresponding to the principal object 110 such that the operating system may perform identification-related tasks on the resource.

If, on the other hand, the second query operation 610 does not locate a principal object 110 containing an identity claim 134 having the type assertion 502 and value assertion 504 specified in the located identity reference 136, the operation flow passes to a create phantom object operation 614. The create phantom object operation 614 creates a phantom principal object because currently in the identity system there is no identity claim 134 to which the identity reference 136 may link. In an embodiment wherein the identity system spans the entire distributed computing environment 100, the data store 108 is operable to all computer systems 142 in the environment 100. Thus, failure to locate an identity claim 134 associated with a particular identity reference 136 means that the claim 134 is maintained on a system that does not form part of the distributed environment 100. The phantom principal object is constructed to contain an identity claim 134 having the type assertion 502 and the value assertion 504 specified in the identity reference 136. Once created, the operation flow passes to a second save operation 616.

The second save operation 616 first links the identity reference 136 to the phantom principal object thereby associating the resource with the principal corresponding to the phantom principal object such that the operating system may perform identification-related tasks on the resource. It should be appreciated that the data store 108 to which the phantom principal object is stored is accessible remotely by other computer systems 142 within the distributed computing environment. As such, further iterations of the second query operation 610, the phantom principal object may be located and retrieved over a remote connection to the data store 108. Alternatively, if the environment is a stand-alone computer system, then the phantom principal object is located and retrieved from local storage.

Next, the second save operation 616 saves the phantom principal object to the data store 108 such that the object may be used in the future for identifying this and other resources as being associated with the phantom object. Also, if more information is received that supplements or adds to information contained in the phantom object, this information may be merged into the phantom object to thereafter build a more complete principal object. Alternatively, if this new information embodies a principal object 110, the phantom object is replaced by this new information. From the second save operation 616, the operation flow concludes at the terminate operation 618.

Figure 7:
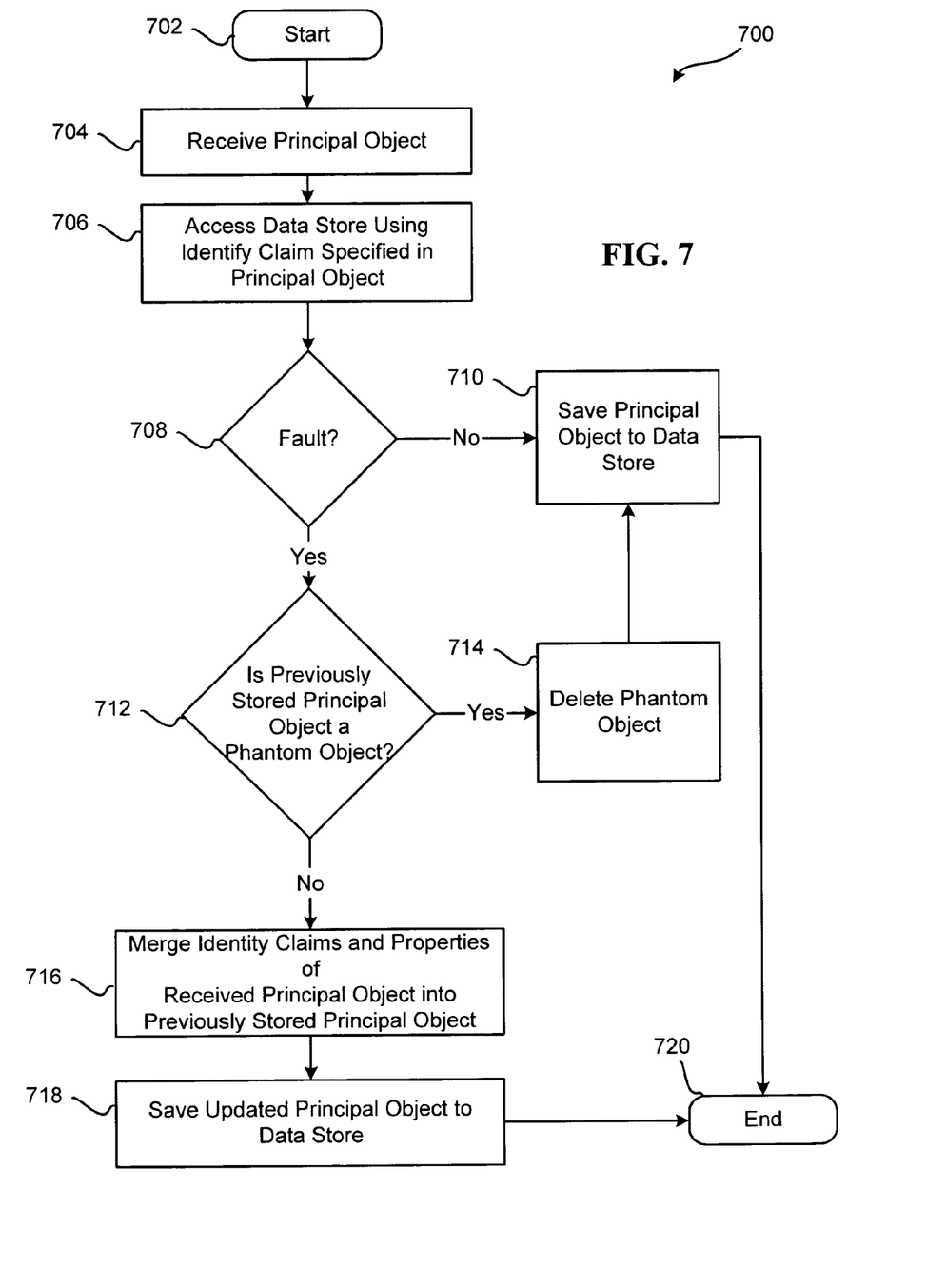
FIG. 7 is a process for detecting a conflict between identity claims within the identity system of FIG. 1 in accordance with an embodiment of the present invention.

FIG. 7 illustrates a process 700 for detecting whether a received principal object 110 conflicts with another principal object 110 stored in the data store 108 at the time that the new principal object 110 is received. Such a conflict is referred to herein as a "fault" and refers to a situation wherein a received principal object 110 contains an identity claim 134 specifying an assertion that is identical to an assertion specified in an identity claim 134 contained in a principal object 10 already stored in the data store 108. This "detection" process 700 is performed using an operation flow that begins with a start operation 700 and concluding with a terminate operation 720.

The start operation 702 is initiated in response to a principal object 110 being received in the computing environment 100. From the start operation 702, the operation flow passes to a receive operation 704, which receives the principal object into the detection process 700. The principal object 110 includes at least one identity claim 134 and optionally includes property data object(s) 138. For simplicity in describing this detection process 700, the received principal object 110 is described as having only one identity claim 134. It should be appreciated that the principal object 10 may contain multiple identity claims 134. In situations wherein multiple identity claims 134 accompany the received principal object 110, it should be understood that the access operation 706 and the fault operation 708 (both described below) should be performed for each of these multiple identity claims 134.

As with the flow diagram of FIG. 6, the term "receive" is being used in a general sense to refer to the reception of any principal object by the operating system of the computer system 142. Exemplary processes which lead to reception of a principal object 110 include, but are not limited to, the input of a principal object 110 by a user and the transmission of a principal object 110 across the communication network 150 between computer systems 142. For example, the principal object 110 may be piggy-backed to a resource sent from a sending computer system 142 to a recipient computer system 142. After the principal object 110 has been received into the detection process 704, the operation flow passes to an access operation 706.

The access operation 706 uses the type assertion 402 and the value assertion 404 specified in the identity claim 134 to look up whether a principal object 110 containing that identity claim 134 is already stored in the data store 108. From the access operation 706, the operation flow passes to a first query operation 708. The first query operation 708 queries whether the access operation 706 found a principal object 110 containing the identity claim 134 used by the access operation 706 to perform the look-up in the data store 108. In an embodiment, this examination is performed based on the type assertion 402 and the value assertion 404, and optionally the time frame assertions 410 and 412, specified in identity claim 134 of the received principal object 110. Alternatively, other assertions (i.e., the signature assertion 414 or the webpage assertion 408) may be used in this examination. If a principal object 110 having the evaluated assertion is not found in the data store 108, then there is no fault and the operation flow passes to a save operation 710. The save operation 710 saves the received principal object 110 to the data store 108 for future use in identifying resources associated with identity references 136 linking to the identity claim 134 contained in the principal object. From the save operation 710, the operation flow concludes at the terminate operation 720.

If the first query operation 708 finds a principal object 110 containing an identity claim 134 specifying the same assertion as the one evaluated by the access operation 708, then an identity fault is detected and the operation flow passes on to a second query operation 712. There exist numerous ways in which a fault may be created on the identity system. One such way is if a user attempts to add a principal object 110 which is already present on the identity system. A second way in which a fault may be created is when two or more systems contain principal objects corresponding to the same principal, and because individuals or applications transmit these objects in the distributed environment 100, these objects are ultimately loaded on the same identity system. A third such way is if an attacker attempts to inject a fake object into the identity system.

The second query operation 712 examines the faulting principal object 110, i.e., the one found in the data store 108 to determine whether this object 110 is a phantom object, such as the phantom objects created by the establishment process 600 of FIG. 6. If the object is a phantom object, the operation flow passes to a delete operation 714. The delete operation 714 deletes the phantom object such that the received principal object 110 may be saved to the data store by the save operation 710. As such, from the delete operation 714, the operation flow passes to the save operation 710 and continues as previously described.

If, on the other hand, the faulting principal object 110 is not a phantom object, the operation flow passes to a merge operation 716. The merge operation 716 merges all the data associated with the received principal object 110 into the faulting principal object 110. For example, if the received principal object 110 includes a display assertion 406, but the faulting principal object 110 does not, this display assertion 406 is copied into the faulting object 110. Likewise, data contained in the property data object 138 of the receiving principal object 110 that is not included within the faulting object 110 is copied into the faulting object. If, for some reason, certain assertions or fields of data conflict and do not specify the same data (i.e., the display string for the display assertion 406 of the received object 110 differs from the display assertion 406 of the faulting object 110), then the fault is resolved using a process by which a user or computer application selects one of the two alternatives to be included within the faulting principal object 110. From the merge operation 716, the operation flow passes to a save operation 718.

The save operation 718 saves the updated principal object 110 to the data store 108 for future use in identifying resources associated with identity references 136 linking to the identity claim 134 contained in this updated principal object. From the save operation 718, the operation flow concludes at the terminate operation 720.

The various embodiments described above are provided by way of illustration only and should not be construed to limit the invention. Those skilled in the art will readily recognize various modifications and changes that may be made to the present invention without following the example embodiments and applications illustrated and described herein, and without departing from the true spirit and scope of the present invention, which is set forth in the following claims.

The invention claimed is:

1. A system for identifying principals within a computing environment, the system comprising: one or more processing units; at least one memory including instructions that, when executed by the one or more processors, create a system comprising: a plurality of principal objects, wherein each principal object corresponds to a specific principal authenticated to perform a digital action within the computing environment and wherein each principal object is operable for use by a computer process within the computing environment to associate a plurality of resource objects with the specific principal corresponding to the principal object; a plurality of identity claims, wherein each identity claim uniquely identifies the specific principal corresponding to each specific principal object, and wherein at least one of the plurality of principal objects comprises two or more identity claims each uniquely identifying the specific principal corresponding to the at least one principal object; and a plurality of identity references, wherein each of the plurality of identity references comprise at least part of one of the resource objects within the computing environment, and wherein each of the plurality of identity references identifies its associated resource object as being associated with a specific principal based on a link assertion within the identity reference to a specific identity claim; wherein each of the plurality of identity claims comprises a type assertion and a value assertion that collectively identify the specific principal corresponding to the principal object to which each of the identity claims are associated; wherein the link assertion within each of the plurality of the identity references comprises the type assertion and the value assertion specified in the specific identity claim to which each identity reference is linked.

2. A system as defined in claim 1, wherein a first type assertion for a first identity claim associated with a first principal object indicates that the value assertion in the first identity claim comprises an electronic mail address uniquely associated with a first principal corresponding to the first principal object.

3. A system as defined in claim 2, wherein the first identity claim further comprises a start time reference assertion indicating a point in time when the email address was initially associated with the first principal.

4. A system as defined in claim 3, wherein the first identity claim further comprises an end time reference assertion indicating a point in time when the association between the email address and the first principal lapses.

5. A system as defined in claim 1, wherein a second type assertion for a second identity claim associated with the first principal object indicates that the value assertion in the second identity claim comprises a telephone number uniquely associated with the first principal.

6. A system as defined in claim 1, wherein the computing environment is a distributed computing system, and wherein at least one identity reference is maintained on a computer system different than a computer system on which the identity claim linked to the identity reference is maintained.

7. A computer-implemented method for identifying a first principal authenticated to perform a digital action within a computing environment including at least a first computer system, the method comprising: creating, by the first computer system, a principal object operable for use by a computer process within the computing environment to identify the first principal as being associated with a plurality of resource objects maintained within the computing environment; associating with the principal object a first identity claim uniquely identifying the first principal within a particular identification scheme, wherein unique identification of the first principal within the particular identification scheme is accomplished by assignment of unique identification strings to each of a plurality of principals; receiving a plurality of resource objects associated with a plurality of application programs, wherein each of the plurality of resource objects comprise an identity reference comprising a declaration that links each resource object to the principal object; identifying within the computing environment each of the plurality of resource objects as being associated with the first principal based on the declaration links contained in the associated identity references, wherein the computer process utilizes identification of each of the plurality of resource objects to the first principal to perform at least one task in connection with each identified resource object; and creating a phantom principal object in response to receiving a resource object having a identity reference comprising a declaration that does not link the resource object to the principal object, the declaration comprising an identification string uniquely identifying a second principal within the particular identification scheme, and wherein the phantom principal object is created to include the identification string assigned to the second principal, wherein the resource object is associated with the phantom principal object; saving the phantom principal object to a data store containing the principal object corresponding to the first principal; receiving a new principal object; and replacing the phantom principal object with the new principal object.

8. A method as defined in claim 7, wherein the receiving act comprises: receiving a first resource object having associated therewith a first identity reference linked to the first identity claim based on a first declaration comprising a unique identification string assigned to the first principal, wherein the first resource object represents a first file associated with a first application program; and receiving a second resource object having associated therewith a second identity reference linked to the first identity claim based on a second declaration comprising the unique identification string assigned to the first principal, wherein the second resource object represents a second file associated with a second application program.

9. A method as defined in claim 8, wherein the identifying act comprises: identifying the first file and the second file as being associated with the first principal based on the linking of the first identity reference and the second identify reference to the first identity claim.

10. A method as defined in claim 9, further comprising: associating with the principal object properties associated with the first principal, wherein the task performed by the computer process in response to the identifying act comprises an act of authenticating access by the first principal to at least one of the plurality of resources linked to the principal object.

11. A method as defined in claim 7, further comprising: associating with the principal object properties associated with the first principal, wherein the task performed by the computer process in response to the identifying act comprises an act of displaying a graphical representation of the properties associated with the first principal in conjunction with a graphical representation of at least one of the plurality of resources linked to the principal object.

12. A method as defined in claim 7, further comprising: receiving a second principal object, wherein the second principal object comprises a second identity claim that comprises the identification string assigned to the second principal; and in response to determining that the phantom principal object and the second principal both correspond to the second principal, deleting the phantom principal object from the data store and saving to the data store the second principal object such that the second principal object is operable for use by the identifying act.

13. A method as defined in claim 7, wherein the first identity claim is stored in the computing environment in a data store, the method further comprising: in response to receiving a second identity claim for storage into the data store, determining whether the second identity claim and the first identity claim both specify an identical unique identification string; and in response to determining that both the first identity claim and the second identity claim specify the identical unique identification string, invoking a fault resolution process to determine a primary identity claim that is to be stored in the data store and available to the identifying act.

14. A method as defined in claim 13, wherein the invoking act comprises: merging data stored in the second identity claim into the first identity claim.

15. A method as defined in claim 13, wherein the invoking act comprises: deleting the first identity claim; and storing in the data store the second identity claim.

16. A computer storage medium encoding computer readable instructions that when executed perform a method for identifying a first principal authenticated to perform a digital action within a computing environment, the method comprising: creating a principal object operable for use by a computer process within the computing environment to identify the first principal as being associated with a plurality of resource objects maintained within the computing environment; associating with the principal object a first identity claim uniquely identifying the first principal within a particular identification scheme, wherein unique identification of the first principal within the particular identification scheme is accomplished by assignment of unique identification strings to each of a plurality of principals; receiving a plurality of resource objects associated with a plurality of application programs, wherein each of the plurality of resource objects comprise an identity reference comprising a declaration that links each resource object to the principal object; identifying within the computing environment each of the plurality of resource objects as being associated with the first principal based on the declaration links contained in the associated identity references, wherein the computer process utilizes identification of each of the plurality of resource objects to the first principal to perform at least one task in connection with each identified resource object; wherein the receiving act comprises: receiving a first resource object having associated therewith a first identity reference linked to the first identity claim based on a first declaration comprising a unique identification string assigned to the first principal, wherein the first resource object represents a first file associated with a first application program; and receiving a second resource object having associated therewith a second identity reference linked to the first identity claim based on a second declaration comprising the unique identification string assigned to the first principal, wherein the second resource object represents a second file associated with a second application program.

17. A method as defined in claim 16, wherein the identifying act comprises identifying the first file and the second file as being associated with the first principal based on the linking of the first identity reference and the second identify reference to the first identity claim.

18. A method as defined in claim 17, further comprising: associating with the principal object properties associated with the first principal, wherein the task performed by the computer process in response to the identifying act comprises an act of authenticating access by the first principal to at least one of the plurality of resources linked to the principal object.

19. A method as defined in claim 16, further comprising: associating with the principal object properties associated with the first principal, wherein the task performed by the computer process in response to the identifying act comprises an act of displaying a graphical representation of the properties associated with the first principal in conjunction with a graphical representation of at least one of the plurality of resources linked to the principal object.

20. A method as defined in claim 16, wherein the first identity claim is stored in the computing environment in a data store, the method further comprising: in response to receiving a second identity claim for storage into the data store, determining whether the second identity claim and the first identity claim both specify an identical unique identification string; and in response to determining that both the first identity claim and the second identity claim specify the identical unique identification string, invoking a fault resolution process to determine a primary identity claim that is to be stored in the data store and available to the identifying act.

21. A method as defined in claim 20, wherein the invoking act comprises: merging data stored in the second identity claim into the first identity claim.

22. A method as defined in claim 20, wherein the invoking act comprises: deleting the first identity claim; and storing in the data store the second identity claim.

23. A method as defined in claim 16, wherein each of the plurality of identity claims comprises a type assertion and a value assertion that collectively identify the specific principal corresponding to the principal object to which each of the identity claims are associated.

24. A method as defined in claim 23, wherein the link assertion within each of the plurality of the identity references comprises the type assertion and the value assertion specified in the specific identity claim to which each identity reference is linked.

25. A method as defined in claim 24, wherein a first type assertion for a first identity claim associated with a first principal object indicates that the value assertion in the first identity claim comprises an electronic mail address uniquely associated with a first principal corresponding to the first principal object.

* * * * *